United States Patent [19]

Berglind

[11] 4,176,250
[45] Nov. 27, 1979

[54] TIME DIVISION MULTIPLEXING SYSTEM FOR AN AUTOMOBILE

[75] Inventor: Bradford L. Berglind, Marietta, Ga.

[73] Assignee: General Motors Corporation, Detroit, Mich.

[21] Appl. No.: 920,994

[22] Filed: Jun. 30, 1978

[51] Int. Cl.$^2$ ............................................. G08C 15/12
[52] U.S. Cl. ............................ 179/1 VE; 179/15 AW; 179/15 AQ
[58] Field of Search ........ 179/1 VE, 15 AW, 15 AQ, 179/15 BA, 15 A; 307/9, 10 R, 10 SB, 12, 38, 40; 340/52 F, 168

[56] References Cited

U.S. PATENT DOCUMENTS

| | | | |
|---|---|---|---|
| 3,544,803 | 12/1970 | Taylor | 307/10 R |
| 3,651,454 | 3/1972 | Venema et al. | 340/52 F |
| 3,683,197 | 8/1972 | Ives | 307/10 R |
| 3,742,447 | 6/1973 | Sognefest et al. | 340/52 F |
| 3,760,109 | 9/1973 | Kogo et al. | 179/15 BA |
| 3,796,992 | 3/1974 | Nakamura et al. | 179/15 BA |
| 4,085,403 | 4/1978 | Meier et al. | 340/168 R |

FOREIGN PATENT DOCUMENTS 2740620  3/1978  Fed. Rep. of Germany ........... 340/168

OTHER PUBLICATIONS

L. Nevett, "Time Shared Multiplexing (for) Motor Venicles", Auto. Eng. Congress, Feb. 23–27, 1976, Paper No. 760181.

Primary Examiner—Kathleen H. Claffy
Assistant Examiner—E. S. Kemeny
Attorney, Agent, or Firm—Albert F. Duke

[57] ABSTRACT

A time division multiplex system includes pulse width modulation to provide an automobile interrogate and control system whereby either the driver or front seat passenger can manually-operate switches mounted on doors to control door locks, windows and seat positioners. The system includes a transmitter module located in the left front door which transmits information to receiver modules interconnected by a data line and located in the passenger doors and under the front seat. The receiver in the right front door is capable of modifying the information received from the transmitter and placing the modified data on the data line to permit control of the right seat adjuster and all of the vehicle doors from the control located in the right front door. Stall of window motors or door lock solenoids is avoided through priority logic.

7 Claims, 6 Drawing Figures

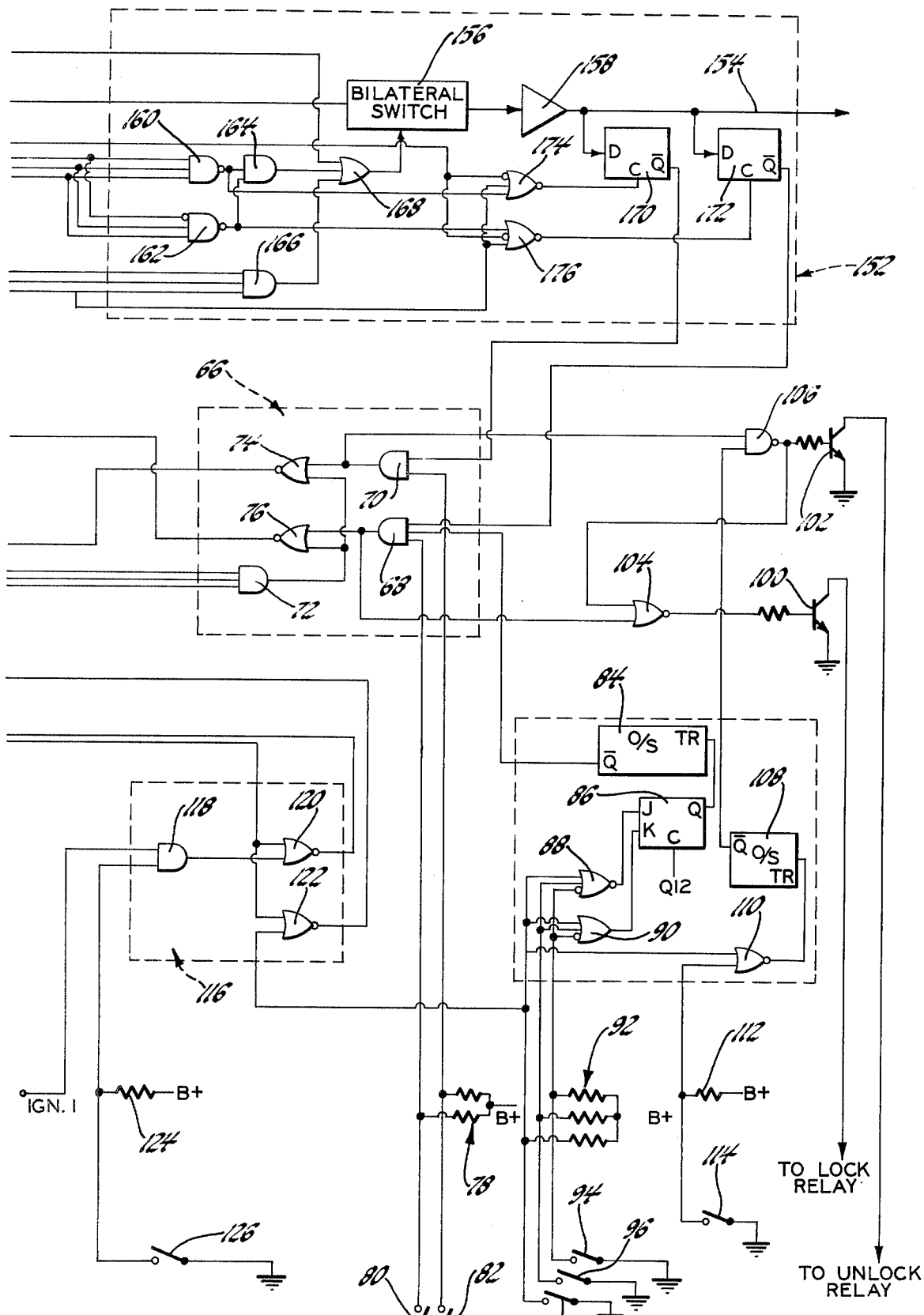

TIME DIVISION MULTIPLEXING SYSTEM FOR AN AUTOMOBILE

This invention relates to time division multiplexing systems and more particularly to a pulse width modulated time division multiplexing system for an automobile.

The automotive electrical system in modern vehicles has become very complex due to consumer demands for convenience features and the sophistication of the vehicle. This increased complexity has resulted in a dramatic increase in wire usage in the automobile and has created many problems for the conventional wiring harnesses. These problems have prompted several prior art proposals for the utilization of multiplexing techniques as a means of simplifying the required wiring in the automobile.

One of the problem areas of the automobile electrical system which lends itself to multiplexing is the passenger compartment electrical subsystem. This subsystem includes the wiring for the power door locks, the power windows and the power seat adjusters. The electromechanical actuators used in the passenger compartment electrical subsystem require high currents and the wiring system must utilize heavy gauge wiring to carry these currents. The switching arrangement for the power windows and power door locks is relatively complex and many feet of heavy gauge wiring is necessary. Another problem area within the passenger compartment subsystem arises from the electrical components being located in the doors. The necessary wiring that must pass through the vehicle body to the doors through holes in the pillars and doors is very large and unwieldy, causing difficulties in installation. Many large connectors are needed to connect the door harnesses to the body harness and the available space for the bundle of wires and the many conductors is nearly exhausted on some car styles. The switching of the motors and solenoids utilized in the passenger compartment subsystem is also a problem. These actuators are inductors that cause high voltage arcing during switching. As a result, heavy switches with precious metal contacts must be used.

In present systems the car door lock feature of the passenger compartment subsystem allows the doors to be locked or unlocked by activating either of two switches in the front doors. If the two switches are activated in opposite modes, an undesirable stall condition results.

The power window circuit uses wound field electric motors to operate the windows and control switches located in the door trim panels. The driver's door contains switches to operate all four power windows while each of the three passenger doors contain one switch to operate their respective windows. If the switches in the passenger's door and the driver's door that control the same window are operated in opposite modes the window motor will stall.

In certain vehicles there are two power seat adjusters provided, one for the driver's seat and another for the passenger's seat with the control switches located in the doors. There is often a six-way power seat adjuster on the driver's side and a four-way power seat adjuster on the passenger's side. The six-way adjuster requires five signals: two motor signals and three transmission signals. The motor signals define the direction of rotation of the motor, while the transmission signals select the gears to be driven by the motor. The gears used are front and rear jackscrews for up and down movement of the seat and rack and pinion for fore and aft movement. The four-way seat adjuster for the passenger seat requires four signals: two for motor direction and two for the transmission. The four-way adjuster allows power movement fore and aft and a power recliner for the seat back.

With the foregoing in mind, it is an object of the present invention to provide an improved time division multiplexing system for controlling the door locks in a passenger vehicle.

It is another object of the present invention to provide an automotive multiplexing system which alleviates a stall condition in operating the door locks of the vehicle.

It is another object of the present invention to provide a multiplexing system for the passenger compartment subsystem of an automobile giving priority to the driver's window control switches over the passenger's window control switches and avoiding stall of the window motors.

It is another object of the present invention to provide a pulse width modulated time division multiplexing system for the passenger compartment of an automobile in which a transmitter module is mounted in the driver's door and a receiver module is mounted in the passenger door and wherein data representing the status of the passenger door switches is placed on a bidirectional data line in response to a predetermined address by modifying data supplied from the transmitter module.

In accordance with the present invention a serial time division multiplex system is provided which permits locking of all vehicle doors from either the driver or passenger door lock switches. The system includes a transmitter mounted at the driver's door and interconnected by a transmission line with a receiver mounted in each of the passenger doors. The transmitter sequentially addresses each of the passenger modules by generating a pulse width modulated serial bit stream containing address and data bits. Each receiver module contains decoder circuitry which responds to a unique address. The data bits command whether the doors should be locked or unlocked and are representative of the status of the driver's or front passenger's door lock switches.

The transmitter also generates a door lock return address which is decoded by the right front passenger module. After this particular address is generated, the transmission line is placed in a receive mode and the data bits for this address are supplied by the right front passenger module and represent the status of the right front passenger door lock switch. This address is also decoded within the transmitter module to enable a storage device in the transmitter module which stores the logic level on the transmission line during the bit cell intervals assigned to the data bits for the door lock return address. In the preferred embodiment, one or the other of two data bits is lengthened beyond the normal logic 1 pulse width and this modification of the pulse width is detected by a timing signal which occurs during the bit cell interval but after the normal logic 1 pulse width interval has expired. The driver's door lock mechanism responds to the status of the storage device as well as the status of the driver's door lock switches. The data in the storage device is then transmitted to the passenger door modules along with each module's unique address whereby all the door lock mechanisms respond to the status of the passenger door lock switch. The system also provides multiplex control of all windows from switches located in the driver's door and disables the passenger's door lock and window switches in response to a command generated by a lock out switch located in the driver's door.

The data bit modification scheme used in connection with locking the doors is also used to control the left front seat adjuster mechanism, located under the seat, from the left front passenger seat adjuster switches which are located in the door.

The system also includes logic which gives priority to a driver door unlock command in the event of concurrent lock and unlock commands. Priority is also given to the multiplexed driver window control commands over the passenger window control commands, thus preventing a stall condition from arising.

These and other objects of the present invention will be more apparent from the following detailed description which should be read in conjunction with the drawings in which:

FIGS. 1a and 1b are schematic diagrams of the transmitter module located in the driver's door;

Figure 1A:
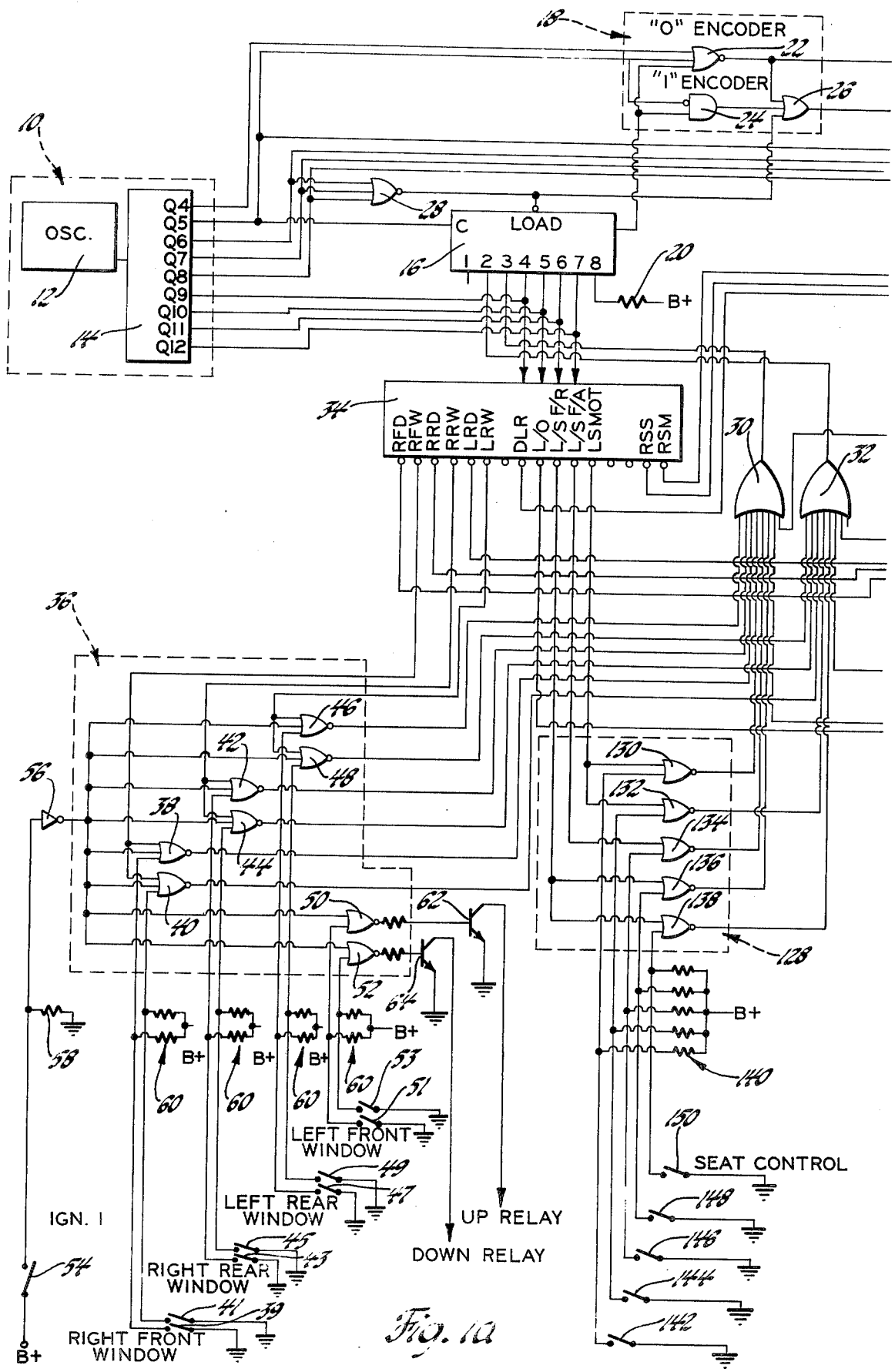

Referring now to the drawings and initially to FIGS. 1a and 1b, the transmitter module comprising an address generator generally designated 10 which includes an oscillator 12 connected with a nine bit binary ripple counter 14. The oscillator 12 operates at 320 khz. to produce a logic "0" pulse width of 25 microseconds at the Q4 output of the counter 14 and a logic "1" pulse width and timing clock signal of 50 microseconds from the Q5 output of the counter 14. The Q9, Q10, Q11 and Q12 outputs of the counter 14 provide four address bits with a new address being generated every 800 microseconds. The counter 14 also functions as a bit counter which defines the location of each bit of a word. Each word contains seven bits with a start of message pulse being provided in bit cells zero and one, the address in bit cells two through five, data bit one in bit cell six and data bit two in bit cell seven.

The four bit address from the Q9–Q12 outputs of the counter 14 are applied to inputs 4–7 of a parallel to serial converter 16. The parallel address and data information is converted to serial information by the converter 16 and encoded into pulse width modulated data by the encoder 18 using the timing signals from the counter 14. Data is supplied to inputs 2 and 3 of the converter 16. Input 8 of the converter 16 is tied to B+ through a pull-up resistor 20. The encoder 18 comprises gates 22, 24 and 26. A gate 28 has its inputs connected with the Q6, Q7 and Q8 outputs of the counter 14 and its output connected with the LOAD/START input of the converter 16. When the bit count equals 0 the LOAD/START signal goes high which loads the converter 16 with the address and data at inputs 2-7 and position 8 is loaded with a "1". The address and data codes for the system are listed in Table 1.

| ADDRESS D C B A | DESCRIPTION | 0/0 | 1/0 | 0/1 | 1/1 |
|---|---|---|---|---|---|
| 0 0 0 0 | Right Front Door Lock | — | Lock | Unlock | — |
| 0 0 0 1 | Right Front Window | — | Up | Down | — |
| 0 0 1 0 | Right Rear Door Lock | — | Lock | Unlock | — |
| 0 0 1 1 | Right Rear Window | — | Up | Down | — |
| 0 1 0 0 | Left Rear Door Lock | — | Lock | Unlock | — |
| 0 1 0 1 | Left Rear Window | — | Up | Down | — |
| 0 1 1 0 | — | — | — | — | — |
| 0 1 1 1 | Door Lock Return | — | Lock | Unlock | Unlock |
| 1 0 0 0 | Unlock Window/Enable Lockout | — | Lockout | Enabled | Both |
| 1 0 0 1 | Left Seat Adjuster Solenoid Front/Rear | — | Engage Front Rear | Engage Both | Engage |
| 1 0 1 0 | Left Seat Adjuster Solenoid Fore/Aft | — | Engage Fore/Aft | — | Engage Fore/Aft |
| 1 0 1 1 | Left Seat Adjuster Motor | — | Aft & Up | Fore & Down | — |
| 1 1 0 0 | — | — | — | — | — |
| 1 1 0 1 | — | — | — | — | — |
| 1 1 1 0 | Right Seat Adjuster Solenoid | — | Engage Fore/Aft | Engage Recline | Engage Both |
| 1 1 1 1 | Right Seat Adjuster Motor | — | Fore & Up | Aft & Down | — |

— Indicates no action.

The two data bits are loaded into the converter 16 from gates 30 and 32. Loading of the data bits with the associated address is accomplished by decoding the four bit address with a 1 of 16 decoder 34. Window data enable logic generally designated 36 comprises gates 38–52. Each of the gates 38–52 are disabled whenever the ignition switch 54 is in a position other than IGNITION ON. This is accomplished by connecting one input of each of the gates 38–52 with the ignition switch 54 through an inverter 56 and to ground through a pull-down resistor 58. When the ignition switch 54 is in other than the IGNTION ON position, each of the gates 38–52 is disabled. A second input to each of the gates 38–52 is from B+ through pull-up resistors 60 and to ground through respective up/down window control switches designated 39, 41, 43, 45, 47, 49, 51 and 53. For example, the gate 38 is enabled when the right front window control switch 39 is closed to the window up command position while the gate 48 is enabled when the left rear window switch 49 is in the window down command position. The gates 38 and 40 are enabled when the input from the decoder designated RFW (right front window) goes low. Similarly, gates 42 and 44 are enabled when the input from the decoder designated RRW (right rear window) goes low and the gates 46 and 48 are enabled when the input from the decoder designated LRW (left rear window) goes low. Since the left front door power windows are controlled only by the switch in the left door, there is no need to provide an address and corresponding decoder output to enable the gates 50 and 52. Instead the up relay or the down relay for the left front window is controlled directly from the left front door power window switches through the gate 50 and transistor 62 or the gate 52 and transistor 64, respectively. The gates 38, 40; 42, 44; 46, 48; are thus enabled in succeeding time slots by the decoder 34 as the addresses for the corresponding window switches are generated. If any one or more of the window switches is closed the outputs of the corresponding gates 38-48 will be driven high causing the appropriate output of the gates 30 and 32 to go high and thus present a two bit data pattern to inputs 2 and 3 of the converter 16 prior to generation of the next LOAD/START pulse from the counter 14.

The information to operate the power door locks originates in three locations namely the left front door lock switch, the right front door lock switch and automatic door lock logic. Door lock data enable logic generally designated 66 comprises gates 68, 70 and 72 which perform an OR logic function and gates 74 and 76 which perform an AND logic function. The gates 68 and 70 are connected to B+ through pull-up resistors 78 and to ground through the driver's door lock switch 80 and door unlock switch 82. The gate 68 also receives an input from a one shot multivibrator 84, controlled by a JK flip-flop 86 which is clocked from the Q12 output of the counter 14. The J & K inputs of the flip-flop 86 are respectively controlled from gates 88 and 90 which have inputs to B+ through pull-up resistors 92 and to ground through a door jam switch 94, a seat occupancy responsive switch 96, and a transmission selector switch 98. Switch 94 closes when the door opens, the switch 96 closes when the seat is occupied and the switch 98 closes when the transmission selector is placed in the DRIVE position. Accordingly, the output of the gate 68 goes low for the duration of the one shot multivibrator 84 if the door is closed, the seat is occupied and the transmission selector is in the DRIVE position; or the driver's door lock switch 80 is closed. Likewise, the output of the gate 70 goes low if the driver actuates the door unlock switch 82 to the unlock position. The lock relay and the unlock relay for the driver's door lock mechanism are controlled from respective transistors 100 and 102 which in turn are controlled by gates 104 and 106. The gate 106 receives inputs from the gate 70 and from a one shot multivibrator 108 which is triggered from a gate 110. The gate 110 is connected to B+ through a pull-up resistor 112 or a switch 114 responsive to operation of the inside door handle and also to the selector switch 98. The gate 106 thus produces a high output to turn on the transistor 102 if the driver unlock switch 82 is closed or the switch 114 is closed while the transmission selector is in other than the DRIVE position. The gate 104 is connected with the output of the gate 68 to turn on the transistor 100 and cause the driver's door to be locked, whenever the output of the gate 68 goes low, unless there has been a command to unlock the driver's door, in which event the output of the gate 106 will be high thereby disabling the gate 104 thus giving priority to unlocking of the driver's door in the event that lock and unlock commands are received concurrently.

The gates 74 and 76 are enabled during each of the time slots associated with the locking of the passenger doors, i.e., when any of the outputs of the decoder 34 designated RFD (right front door), RRD (right rear door) or LRD (left rear door) are low. When the gates 74 and 76 are enabled by the gate 72 they effectively invert the outputs of the gates 70 and 68 respectively and through the gates 32 and 30 produce a logic 1 data bit at input 3 of the convertor 16 if the doors are to be unlocked, and a logic 1 data bit to input 2 of the convertor 16 if the doors are to be locked.

Data bits are also provided from lock out logic generally designated 116 which comprises gates 118, 120 and 122. The function of the logic 116 is to disable the passenger window and door lock switches under certain conditions. The gate 118 receives inputs from B+ through a pull-up resistor 124 or ground through a window lock out switch 126 and from the ignition switch 54. The gate 120 responds to the output of the gate 118 and the L/O output of the decoder 34 to produce a logic one data bit at input 3 of the converter 16 if the window lock out switch 126 is closed by the driver. As will be shown in the discussion of the receiver modules a logic 1 in this data bit position will disable the passenger window switches. The gate 122 responds to L/O output of the decoder 34 and the transmission selector switch 98 to disable the passenger door lock switch when the transmission selector is in the DRIVE position.

Power seat data enable logic 128 comprises gates 130-138 which receive inputs from B+ through pull-up resistor 140 or the driver's seat adjuster control which comprises five switches 142-150. The switches 142-150 may be operated from a single control actuator to control the appropriate adjuster solenoids and the direction of motor rotation to accomplish the desired seat movement. The switches 142 and 144 control the direction of motor rotation while the switches 146-150 control the solenoid which select the gears to be driven by the motor. Accordingly, the gates 130 and 132 are enabled from the single output of the decoder designated LSM which goes low in response to generation of the addresses to the left seat adjuster motor. The gates 136 and 138 are enabled from the output of the decoder designated LSF/R which goes low in response to the addresses associated with the left seat adjuster solenoid which produces up and down movement of the front or rear of the seat. The gate 134 is connected with the outputs of the decoder 34 designated LSF/A which responds to the address generated for the seat adjuster solenoid which controls fore and aft movement of the seat. The output of the gates 130, 134 and 136 provide inputs to the gate 30 while the gates 132 and 138 provide inputs to the gate 32 to establish the indicated data patterns listed in TABLE 1.

Transmission line control logic and return signal decoder logic generally designated 152 is provided for controlling whether the data line is in a transmit or receive mode and for storing data bits supplied by the front passenger control switches. A transmission line 154 is controlled by a bilateral switch 156 which either permits or prevents data from the encoder 18 from reaching a transmission line driver 158. The switch 156 in turn is controlled from gates 160, 162, 164, 166 and 168. During the time slots assigned for addressing the passenger door lock switch (DLR) or seat adjuster switch (RSS, RSM) the bilateral switch 156 is disabled through the gates 166 and 168 during that portion of the data bit interval following the transmission of a zero pulse width. It will be noted that during the DLR time slot zero logic levels appear at the inputs 2 and 3 of the converter 16, and accordingly, during the data bit intervals the encoder 18 produces a zero data bit pulse width at the output of the gates 22 and 26. The output of the encoder 18 is applied to the line driver 158 through the bilateral switch 156 and placed on a transmission line interconnecting the transmitter with the remote receivers located in the passenger doors and under the seat. The return signal decoder 152 also includes a pair of D type flip-flops 170 and 172 having their $\overline{Q}$ outputs connected respectively as inputs to the gates 70 and 68. The flip-flops 170 and 172 are clocked from respective outputs of gates 174 and 176 and have their D inputs connected with the transmission line 154 to receive data from the remote receiver mounted in the passenger's door. The flip-flops 170 and 172 are clocked from the Q5 output of the counter 14 during the first and second data bit intervals respectively during the DLR time slot. The data clocked into the flip-flops 170 and 172 is supplied to the logic 66 so that the data transmitted with the passenger (RFD) and rear door (RRD and LRD) addresses will cause the passenger and rear door locks to be operated in accordance therewith.

Figure 2:
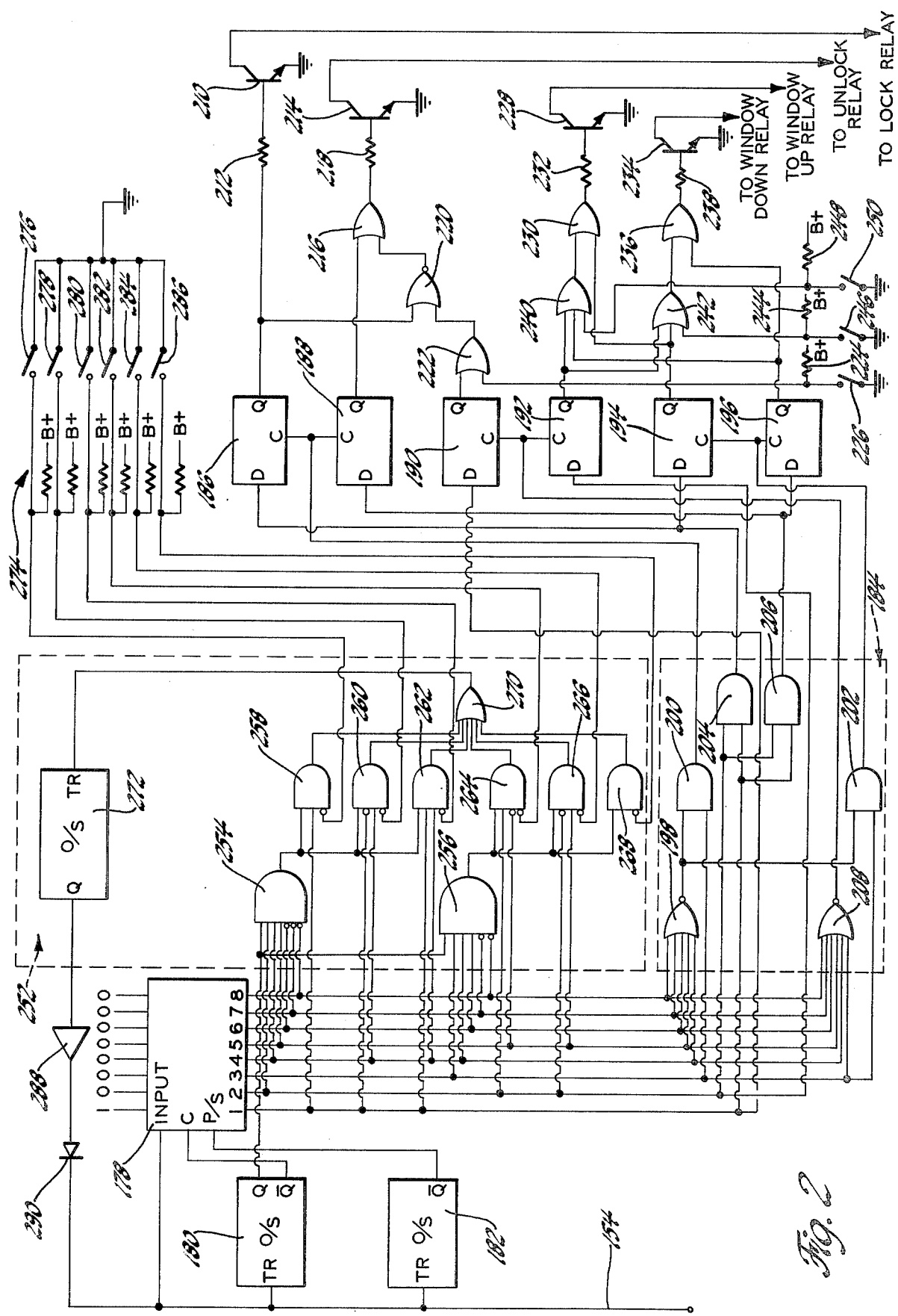
FIG. 2 is a schematic diagram of the receiver module located in the front passenger's door.
Figure 3A:
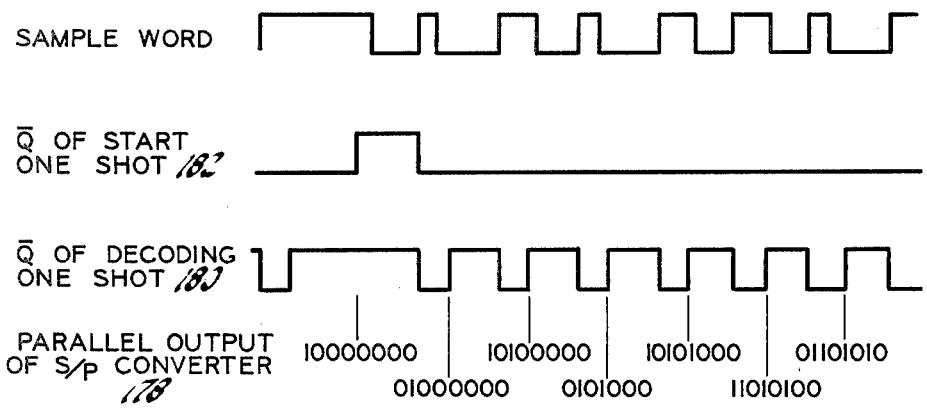
FIGS. 3a and 3b are timing diagrams useful in explaining the invention.

Referring now to FIG. 2, the right front door module receives information from the left front door module, the right front door switches and the right seat adjuster switches, transmits return information and controls the power to the right front door electromechanical actuators. To accomplish this the right front door module detects the start pulses, decodes the incoming pulse width modulated data, converts the serial information to parallel information, stores the appropriate information from the left front door module, modifies data bits for return signals, and drives lock and window relays. As shown in FIG. 2, the right front door module comprises a serial to parallel converter 178 having its serial input connected with the transmission line 154, its clock input connected with the $\overline{Q}$ output of retriggerable one shot 180 and its P/S input connected with the $\overline{Q}$ output of a retriggerable one shot 182. The trigger inputs of the one shots 180 and 182 are connected with the transmission line 154. The start of message pulse, which is 150 microseconds in duration, is detected by the one shot 182 which introduces a 125 microsecond delay of the leading edge of the data bits on line 154. The leading edges of the address and data bits are spaced 100 microseconds apart causing the one shot 182 to be retriggered before it times out, holding its $\overline{Q}$ output high and its $\overline{Q}$ output low during the address and data bit transmission. The start of message pulse is 150 microseconds in duration and is therefore long enough to allow the one shot 182 to time out and its $\overline{Q}$ output to go high. The $\overline{Q}$ output of one shot 182 signals the detection of the start pulse and is used to load the converter 178 with a set of position detecting bits (10000000) which are used to determine the position of the incoming serial word of information. The decoding of the serial pulse width modulated information is accomplished with the clocking of the converter 178. The clock pulse is provided by the $\overline{Q}$ output of one shot 180 which is triggered by the leading edge of the incoming pulses. The one shot 180 times out 37 microseconds after being triggered and the $\overline{Q}$ output goes high, thereby entering the data at the input to the converter 178. If a 25 microsecond "0" pulse has been transmitted, the data line 154 will be low when the converter 178 is clocked and a zero will be entered. If a 50 microsecond "1" pulse has been transmitted, the data line 154 will be high when the converter 178 is clocked and a "1" will be entered. As mentioned earlier, the start of message pulse inputs a set of positioning detecting bits (10000000). This is done to determine when the incoming serial word transmission is complete. A timing diagram showing a sample PWM word, the start pulse detection, the clock, and the decoded parallel output of the converter 178 is shown in FIG. 3a. After the last data bit has been entered into the converter 178 the parallel output is 01101010 for the sample word shown in FIG. 3a. The first two positions are the data bits, the next four are the address bits and the final two are position detecting bits. When the positions 7 contains a "1" and position 8 contains a "0" the incoming word is in position to be decoded by logic generally designated 184 to determine if the address pertains to the RFD module. If the address does pertain to the RFD, the information in the data bits is stored in the appropriate ones of the flip-flops 186–196. The decoder logic 184 comprises gates 198–208. When the incoming bits are in position to be decoded, the output of the gate 200 goes high to clock the flip-flops 186 and 188 if the door lock address 0000 is received. If the window address 0001 is received, the output of the gate 202 goes high to clock the flip-flops 194 and 196. The data bits associated with the door lock address or the window address are decoded by the gates 204 and 206 to product a logic 1 at the D inputs of the flip-flops 186 and 194 if the doors are to be locked or the right passenger window is to be raised. Similarly, the gate 206 produces a logic 1 at the D inputs of flip-flops 188 and 196 if the doors are to be unlocked or the window is to be lowered. The gate 208 decodes the lock out address 1000 and clocks the flip-flops 190 and 192. If during the lock out address the transmission selector is in the DRIVE position, a logic 1 appears at the D input to the flip-flop 190 and if the window lock out switch 126 is closed, a logic 1 appears at the D input flip-flop 192.

The flip-flop 186 controls the door lock solenoid through a power interfacing combination including a transistor 210 and a lock relay (not shown). The Q output of the flip-flop 186 is connected with the base of the transistor 210 through a current limiting resistor 212. The flip-flop 188 controls a door unlock solenoid through a transistor 214 and an unlock relay (not shown). The Q output of flip-flop 188 is connected to the base of transistor 214 through a gate 216 and a resistor 218. The other input to the gate 216 is from gates 220 and 222. The gate 222 has one input connected to B+ through a pull-up resistor 224 or to ground through a switch 226 which responds to the right front door inside release handle. The switch 226 is enabled when the Q output of the flip-flop 190 is low, i.e., when the transmission selector switch 98 is not in the DRIVE position. When the transmission selector switch 98 is in the DRIVE position, the output of the gate 222 is high and the output of the gate 220 remains low regardless of the position of the switch 226. The switch 226 may also be disabled by the flip-flop 186 which drives the output of the gate 220 low whenever a multiplexed lock command is received, thus giving priority to the multiplexed door lock switches over the inside remote switch 226.

The flip-flop 192 controls the power window motor through a transistor 228 and a window up relay (not shown). The Q output of the flip-flop 194 is connected with the base of transistor 228 through a gate 230 and a resistor 232. Similarly, the flip-flop 196 controls the power window motor through a transistor 234 and a window down relay (not shown). The Q output of the flip-flop 196 is connected at the base of transistor 234 through a gate 236 and a resistor 238. If a window up command is received the output of the flip-flop 192 goes high to energize the window up relay and if a window down command is received the output of the flip-flop 196 goes high to energize the window down relay. The window motor control relays also respond to window control switches mounted on the right front passenger's door through gates 240 and 242. The gates 240 and 242 are connected with the Q output of the flip-flop 192 and to B+ through pull-up resistors 244 and 248 or window control switches 246 and 250, respectively. Whenever the driver's window lock out switch 126 is closed, the input to the flip-flop 192 is high driving the output of the gates 240 and 242 low regardless of the positions of the front passenger's window control switches 246 and 250 thereby preventing operation of the right front window from the passenger's control switches. If the driver's window lock out switch 126 is open the window motor is controllable from the passenger switch 246 and 250 through the gates 240, 230 or 242, 236 respectively. The gates 240 and 242 may also be disabled from the flip-flops 196 and 194 respectively to give priority to the multiplexed driver window control commands over the passenger window control switches 246 and 250 thus preventing a stall condition from arising.

Figure 3B:
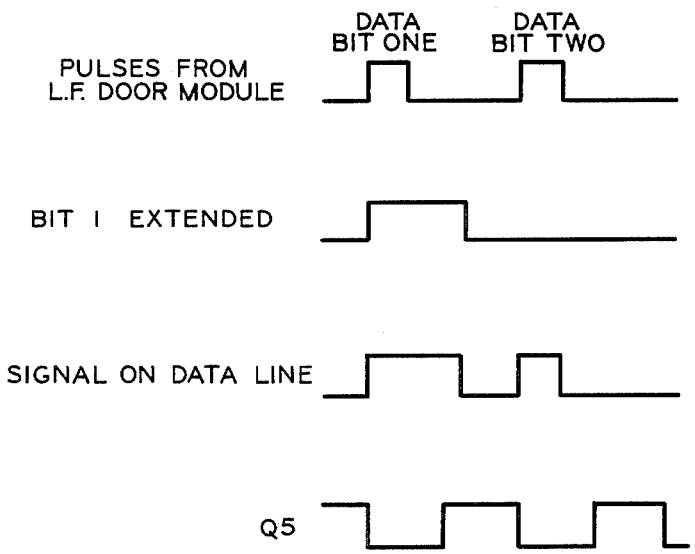

As previously indicated, control of the front passenger door lock solenoids and seat adjuster from the passenger control switches is accomplished by modifying the data bits accompanying the DLR address or the RSS and RSM addresses from the driver's door module. This is accomplished with return signal logic generally designated 252. The logic 252 includes gates 254–270 and a 70 microsecond one shot multivibrator 272. The gates 258–268 are connected to B+ through pull-up resistors generally designated 274 and to passenger control switches 276–286 as shown. The logic 252 examines the address before the data bits are received to determine if the address requires a return signal. The leading edge of the next bit, which is data bit one, triggers the one shot 272 if the logic 252 determines from the switches 276–286 that data bit one should be extended. The one shot 272 takes over the driving of the data line and extends the data bit. The leading edge of data bit 2 triggers the one shot 272 if data bit 2 is to be extended. The output of the logic 252 is connected with the transmission line 154 through a line driver 288 and a diode 290. More specifically, when the DLR address is received, and clocked into the serial to parallel converter 178 and just prior to receipt of the first data bit, the data appearing at the outputs of the converter 178 will be 11101000 at outputs 1–8 respectively. This output enables the gates 254 and 258. When the rising edge of the first data bit triggers the one shot 180 the Q output goes high and if the door lock switch 276 is closed the one shot 272 is triggered by the Q output of one shot 180 through the gates 254, 258, and 270, as shown in FIG. 3b. On the rising edge of Q5 a logic 1 is clocked into the flip-flop 172 thereby causing the driver's door to lock and also for the passenger doors to lock when they are subsequently addressed. On the other hand, if the door unlock switch 278 is closed then on the rising edge of the second data bit the one shot 272 will be triggered from the Q output of the one shot 180 through the gates 256, 264 and 270. Similarly, the gate 254 and the gate 260 responds to entry of the right seat adjuster solenoid address 1110 and the position of the switch 280 to lengthen the first data bit if the switch 280 is closed. This will produce fore or aft movement of the passenger seat depending on the direction of motor rotation selected by the switches 284 and 286. The gates 254 and 262 respond to the right seat adjuster motor address 1111 and the switch 284 to lengthen the first data bit if the switch 284 is closed. The gates 256 and 266 respond to the right seat adjuster solenoid address 1110 and the switch 282 to lengthen the second data bit if the switch 282 is closed. This will produce up or down movement of the passenger seat depending on the direction of motor rotation selected by the switches 284 and 286. The gates 256 and 268 respond to the right seat adjuster motor address 1111 and the position of the switch 286 to lengthen the second data bit if the switch 286 is closed.

Referring now to FIG. 3, the seat adjuster receiver module located under the front seat of the vehicle includes a serial to parallel converter 300 and one shot multivibrators 302 and 304 which operate in the same fashion as corresponding elements in FIG. 2 to load the address and data bits for decoding. When the binary word is in position for decoding, the data bits provide inputs to flip-flops 306–322. The flip-flops 306–314 are clocked from decoding logic comprising gates 324, 326, 328 and 330. The gates 324 and 326 decode the left power seat adjuster solenoid front/rear address 1001 and load the accompanying data into the flip-flops 306 and 308. The Q output of flip-flops 306 and 308 are connected with transistors 332 and 334 through resistors 336 and 338 and control solenoids (not shown) so that the solenoids are energized when the switches 150 and 148 respectively are closed. The gates 324 and 328 respond to the left seat adjuster solenoid fore/aft address 1010 and load the first data bit associated therewith into the flip-flop 310. The Q output of the flip-flop 310 is connected to transistor 340 through resistor 342 and controls a solenoid (not shown) which is energized whenever the switch 146 is closed. The gates 324 and 330 decode the left seat adjuster motor address 1011 to load the first and second data bits associated therewith into the flip-flops 312 and 314. respectively. The Q output of the flip-flop 312 is connected with transistor 344 through resistor 346 and energizes a relay (not shown) whenever the switch 142 is closed. The Q output of the flip-flop 314 is connected with transistor 348 through resistor 350 and energizes a relay (not shown) whenever the switch 144 is closed. The gates 352 and 354 decode the right seat adjuster solenoid address 1110 and load the accompanying data bits into the flip-flops 316 and 318. The Q output of the flip-flop 316 is connected with the transistor 356 through a resistor 358 to energize a solenoid (not shown) whenever the switch 280 is closed. The flip-flop 318 is connected with transistor 360 and resistor 362 to energize a solenoid (not shown) whenever the switch 282 is closed. The gates 352 and 364 decode the right seat adjuster motor address 1111 and load the data bits into flip-flops 320 and 322. The Q output of the flip-flop 320 is connected to a transistor 366 through a resistor 368 and energizes a relay (not shown) whenever the switch 284 is closed. The Q output of the flip-flop 322 is connected with transistor 370 through resistor 372 and energizes a relay (not shown) whenever the switch 286 is closed.

There are two rear door modules, one for the right rear door, and one for the left rear door which control the window motors and door lock solenoids in the rear doors. The only control switch inputs to a rear door module are from a power window switch. The power door locks cannot be operated from the rear doors. The operation of the rear door modules is essentially the same as the right front door module. The detection of the start of message plus, the decoding of the serial data, the serial to parallel conversion, and the data storage are all accomplished with the same techniques as used in the right front door module shown in FIG. 2. The rear modules, however, are not required to send return information to any other module. Therefore, the rear modules are not provided with return signal circuitry. In the interest of brevity these modules will not be discussed in further detail.

The embodiments of the invention in which an exclusive property or privilege is claimed are defined as follows:

1. A time division multiplexing system for an automobile having driver and front passenger manually operated door lock switches for controlling door locking means for placing each of the doors of the automobile in a locked or unlocked condition, said system comprising:

transmitter means mounted in the driver's door for transmitting serial time division multiplexed information in successive time slots in a pulse width modulated format, respective ones of the time slots containing address bits and data bits, said transmitter means including address generator means for periodically generating a unique address assigned to respective passenger door locking means and acccompanying data bits specifying whether the door should be locked or unlocked, said transmitter means also transmitting in one of said time slots a unique address assigned to said front passenger door lock switch, receiver means mounted in each of the passenger doors and including means responsive to the unique address assigned to its door locking means for controlling the respective door locking means in accordance with the accompanying data bits, bidirectional transmission line means interconnecting said transmitter means with each of said receiver means, said front passenger receiver means also responsive to the unique address assigned to said front passenger door lock switch and including means responsive to the status of said front passenger door lock switch for placing on said transmission line means data bits indicative of the status of the front passenger door lock switch during the time slot that the front passenger door lock switch is addressed, said transmitter means further including storage means for storing the data bits placed on the transmission line means by said front passenger receiver means and further including door lock enable logic means responsive to the status of the driver's door lock switch or the state of said storage means for controlling the driver's door locking means, said door lock enable logic means also defining said accompanying data bits during the time slot that each passenger door locking means is addressed, whereby all of said door locking means are controlled from either of said driver or front passenger door lock switches.

2. A time division multiplexing system for an automobile having driver and front passenger manually operated door lock switches for controlling door locking means for placing each of the doors of the automobile in a locked or unlocked condition, said system comprising:

transmitter means mounted in the driver's door for transmitting serial time division multiplexed information in successive time slots in a pulse width modulated format, respective ones of the time slots containing address bits and data bits, said transmitter means including address generator means for periodically generating a unique address assigned to respective passenger door locking means and accompanying data bits specifying whether the door should be locked or unlocked, said transmitter means also transmitting in one of said time slots a unique address assigned to said front passenger door lock switch, receiver means mounted in each of the passenger doors and including means responsive to the unique address assigned to its door locking means for controlling the respective door locking means in accordance with the accompanying data bits, bidirectional transmission line means interconnecting said transmitter means with each of said receiver means, said front passenger receiver means also responsive to the unique address assigned to said front passenger door lock switch and including means responsive to the status of said front passenger door lock switch for placing on said transmission line means data bits indicative of the status of the front passenger door lock switch during the time slot that the front passenger door lock switch is addressed, said transmitter means further including storage means for storing the data bits placed on the transmission line means by said front passenger receiver means and further including door lock enable logic means responsive to the status of the driver's door lock switch or the state of said storage means for controlling the driver's locking means, said door lock enable logic means also defining said accompanying data bits during the time slot that each passenger door locking means is addressed, whereby all of said door locking means are controlled from either of said driver or front passenger door lock switches, said transmitter means including logic means responsive to said door lock enable logic means for giving priority to the unlock status of said driver door lock switch.

3. A time division multiplexing system for an automobile having driver and front passenger manually operated door lock switches for controlling door locking means for placing each of the doors of the automobile in a locked or unlocked condition, said system comprising:

transmitter means mounted in the driver's door for transmitting serial time division multiplexed information in successive time slots in a pulse width modulated format, respective ones of the time slots containing a start of message pulse, address pulses and data pulses, said transmitter means including an address generator comprising a binary counter for periodically generating binary addresses assigned to each passenger door locking means and a binary address assigned to said front passenger door lock switch, address decoder means for decoding the addresses generated by said counter, door lock enable logic means responsive to said driver door lock switch for controlling the driver's door locking means in accordance therewith and responsive to said address decoder means for providing data bits indicative of the status of said driver's door locking switch during the time slots containing the addresses assigned to said passenger door locking means, a parallel to serial converter responsive to a certain state of said counter for loading said address bits and said data bits and to produce a serial binary output bit stream in response to a clock signal generated by said counter, encoder means connected with said converter and said counter for developing said pulse width modulated signal from the output of said converter, receiver means mounted in each of the passenger doors and including means for converting said pulse width modulated signal to a binary format and further including means responsive to the address assigned to its door locking means for controlling the respective door locking means in accordance with the accompanying data bits, bidirectional transmission line means interconnecting said transmitter means with each of said receiver means, said door lock enable logic means providing first and second zero bits to said converter during the time slot containing the address of said front passenger door lock switch, said transmitter means further including means responsive to generation of the address of said front passenger door lock switch for placing said transmission line means in a receive mode during a portion of the bit cell interval remaining after transmission of each of said zero data bits, said receiver means mounted in the front passenger door including logic means responsive to the actuation of said passenger door lock switch for extending the pulse width of at least one of the zero data bits while said transmission line means is in said receive mode, said transmitter means further including return signal decoding means including storage means responsive to said clock signal for storing data in binary format indicative of the status of said transmission line means during said receive mode, said door lock enable logic means also responsive to the data in said storage means, whereby all of said door locking means are controlled in accordance with the status of either of said driver or front passenger door lock switches.

4. A time division multiplexing system as defined in claim 3 further comprising, a door jam switch, a seat occupancy responsive switch, and a transmission drive selector switch, pulse generating means for generating a pulse upon concurrent operation of said door jam switch, said seat switch and said transmission drive selector switch, means connecting the output of said pulse generating means with said door lock enable logic means whereby all of said doors are locked in response to said concurrent operation.

5. A time division multiplexing system for an automobile having driver and passenger manually operated seat control switches and seat adjuster means for positioning the driver and passenger seats respectively, said system comprising:

transmitter means, first and second receiver means, bidirectional transmission line means interconnecting said transmitter means with each of said receiver means, said transmitter means mounted in the driver's door for transmitting serial time division multiplexed information in successive time slots in a pulse width modulated format, one of the time slots containing address bits assigned to the driver's seat adjuster means and data bits representing the status of the driver's seat control switches, another one of the time slots containing address bits assigned to the passenger seat adjuster means and data bits having a pulse width representative of a zero binary state, said first receiver means mounted in the passenger door and including means responsive to the address assigned to the passenger seat adjuster means for lengthening the pulse width of at least one of said zero state data bits during its bit time interval in response to actuation of the passenger seat control switches, and second receiver means responsive to the unique addresses assigned to the driver's seat adjuster means and the passenger seat adjuster means for controlling the respective seat adjuster means in accordance with the data bits accompanying the respective addresses.

6. A time division multiplexing system for an automobile having first and second manually operated control switches at first and second locations respectively within the automobile and a load device intended to be operated independently by either of said switches, said system comprising:

transmitter means mounted at said first location, receiver means mounted at said second location and bidirectional transmission line means interconnecting said transmitter means with said receiver means, said transmitter means transmitting serial time division multiplexed information in successive time slots in a pulse width modulated format, respective ones of said time slots containing address bits and data bits, one of the time slots containing address bits assigned to the second control switch and data bits having a pulse width representative of a zero binary state, another one of the time slots containing address bits assigned to said load device, receiver means at said second location including means responsive to the address assigned to said second control switch for lengthening the pulse width of at least one of said zero state data bits in response to actuation of said second control switch, said transmitter means further including storage means for storing the data bits supplied by the receiver means, said transmitter means further including means responsive to actuation of said first control switch or the state of said storage means for supplying data bits indicative of the status of said first or second control switches during the time slot containing the address of said load device, said receiver means responsive to receipt of the address assigned to said load device for controlling said load device in accordance with the accompanying data bits whereby said load device is actuable independently by either of said control switches.

7. A time division multiplexing system for an automobile having driver and front passenger seat control switches for controlling respective driver and front passenger seat adjuster means, transmitter means mounted in the driver's door for transmitting serial time division multiplexed information in successive time slots in a pulse width modulated format, one of the time slots containing address bits assigned to the driver's seat adjuster means and first and second data bits representing the status of said driver's seat control switch, another one of the time slots containing address bits assigned to said passenger seat adjuster means and first and second data bits of the same pulse width, first and second receiver means,
bidirectional transmission line means interconnecting said transmitter means with each of said receiver means, said transmitter means including means for placing said transmission line means in a receive mode for a predetermined time interval following transmission of said first and second data bits of the same pulse width,
said first receiver means responsive to the addresses assigned to said driver's seat adjuster means and said passenger seat adjuster means for controlling the respective seat adjuster means in accordance with the data bits accompanying the respective addresses,
said second receiver means mounted in the front passenger door including means responsive to the address bits assigned to said passenger seat control switches and to the status of said passenger seat control switches for lengthening at least one of said first or second data bits of the same pulse width while said transmission line is in said receive mode.

* * * * *

UNITED STATES PATENT AND TRADEMARK OFFICE
CERTIFICATE OF CORRECTION

PATENT NO. : 4,176,250
DATED : November 27, 1979
INVENTOR(S) : Bradford L. Berglind It is certified that error appears in the above-identified patent and that said Letters Patent are hereby corrected as shown below:

Column 4, lines 20-23,

"1 0 0 1   Left Seat                          -        Engage  Engage  Engage"
          Adjuster                           Front    Rear    Both
          Solenoid Front/
          Rear should read --

1 0 0 1   Left Seat Adjuster                 -        Engage  Engage  Engage --;
          Solenoid Front/Rear                         Front   Rear    Both Column 4, line 37, insert "TABLE 1".

Column 8, line 22, "product" should read -- produce --

Figure 4:
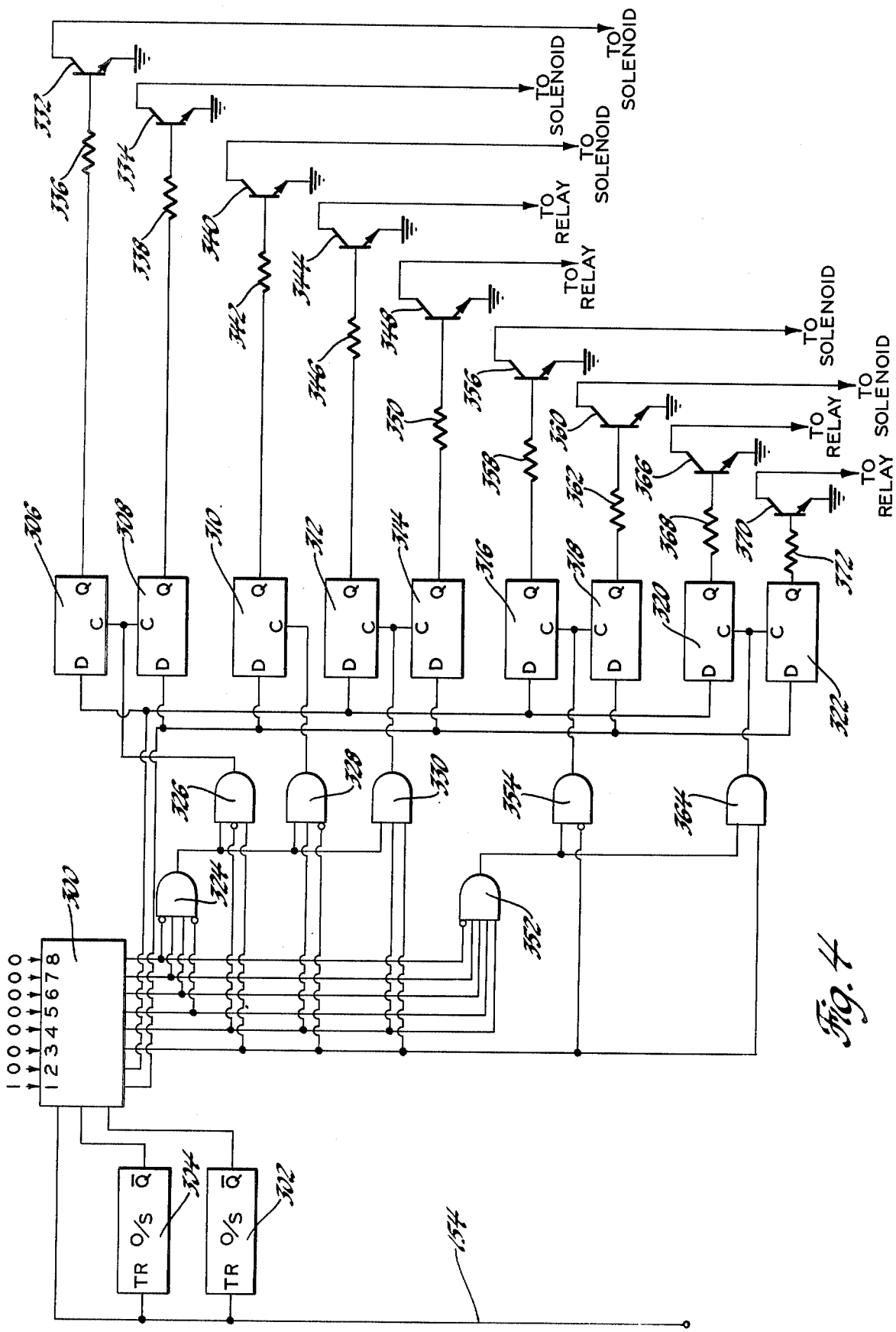
FIG. 4 is a schematic diagram of the receiver module for controlling the front seat adjusters.

Column 10, line 11, "Figure 3" should read -- Figure 4 --;

Column 10, line 67, "plus" should read -- pulse --.

Signed and Sealed this

Twenty-fifth Day of March 1980

[SEAL]

Attest:

SIDNEY A. DIAMOND

Attesting Officer

Commissioner of Patents and Trademarks